United States Patent

[11] 3,599,368

| [72] | Inventor | Oathie Lee Riley |
| | | 7141 Paseo, Kansas City, Mo. 64132 |
| [21] | Appl. No. | 826,854 |
| [22] | Filed | May 22, 1969 |
| [45] | Patented | Aug. 17, 1971 |

[54] SIGNAL DEVICE FOR FISHING ROD
6 Claims, 5 Drawing Figs.

[52] U.S. Cl. ............................................. 43/17,
200/61.13, 340/283
[51] Int. Cl. ............................................. A01k 97/12
[50] Field of Search............................................. 340/261,
283; 200/52 C, 61.13, 61.14, 61.15, 61.16, 61.17,
61.18; 43/16, 17

[56] References Cited
UNITED STATES PATENTS
1,309,365  7/1919  Monighan .................... 43/17

3,343,008  9/1967  Bancroft...................... 200/61.18

Primary Examiner—John W. Caldwell
Assistant Examiner—J. Michael Bobbitt
Attorney—Schmidt, Johnson, Hovey, and Williams ABSTRACT: A signal device for a fishing rod having a reel and length of fishing line, the device indicating the presence fish on the line through movement of a swingable arm which has idler wheels having the line trained thereover, the arm moving a contact plate into engagement with contact points whereby to actuate either a visual or an audio signal device when the arm is swung by virtue of the presence of a fish on the line. The swinging arm is balanced with respect to the upright post which is clamped to the rod and which carries the arm, such balancing under conditions of use being achieved by selectively positioning one of the idler wheels on the swinging arm.

PATENTED AUG 17 1971 3,599,368

INVENTOR.
Oathie Lee Riley
BY Schmidt, Johnson, Hovey
Williams & Chase
ATTORNEYS

SIGNAL DEVICE FOR FISHING ROD

It is the primary object of this invention to provide a signal device for fishing rods having a reel and a length of line, which device is positioned on the rod forwardly of the reel and intermediate the ends of the line, the device including an upright post carried by the rod, the post having a swinging arm at the uppermost end thereof, the arm rotatably carrying a pair of idler wheels over which the fishing line is trained, one of the wheels being selectively positionable on the arm with respect to the post when the device is in use, the position of such wheel and, therefore, the balance of the arm depending upon the conditions of such use.

Yet another important object of this invention is to provide a signal device which, when tension is placed on the fishing line, as when a fish takes the bait, an audio or visual signal is actuated by virtue of the line being trained over the idler wheels whereby to swing the arm and move a contact plate which is carried by said arm into engagement with a pair of contact points disposed in the path of downward swinging movement of the contact plate whereby to complete an electrical circuit and thus actuate the signal device indicating the presence of a fish.

Other objects include the particular manner in which the contact plate is mounted in depending relationship on the swinging arm and is biased toward the contact points whereby to insure positive contact of the points when the arm is swung downwardly; and other details of construction which will become apparent from the following specification and accompanying drawing wherein.

Figure 1:
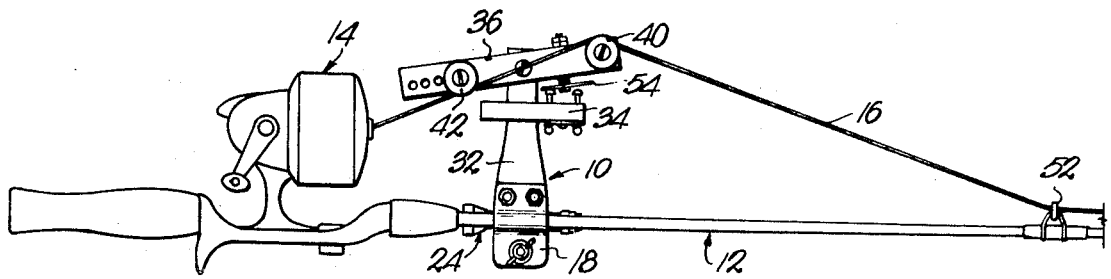
FIG. 1 is a fragmentary elevational view of a fishing rod having the signal device mounted thereon.

The signal device 10 is intended for use with a conventional fishing rod 12 which fishing rod 12 is normally provided with a reel 14 which carries a length of fishing line 16, the line being extended from the reel 14 along the rod 12 and having a suitable hook, lure or the like (not shown) coupled with the free end thereof.

The signal device 10 is carried by rod 12 at a position forwardly of the reel 14 and intermediate the ends of line 16, it being intended that line 16 will be trained over portions of the device 10 in such a manner that when a fish strikes the bait the device 10 will be operated whereby to actuate a visual or audio signal, thereby indicating to the user the presence of a fish on the line.

Device 10 is attached to rod 12 by means of a clamp 18, which clamp 18 includes a convex portion 20 through which the rod 12 passes and which may be securely clamped about the rod 12 through utilization of a tightening screw 22.

Clamp 18 also carries a suitable signal device instrument, the particular device chosen for illustration being in the nature of a signal light 24, which is more specifically in the in the nature of a small battery operated flashlight having a casing 26 and a lens or light end 28. The signal light 24 is retained in position with the light end 28 thereof facing the reel 14 and, therefore, the user, by means of the clamp 18 which includes a second convex portion 30 disposed oppositely to portion 20 and embracing the casing 26 of light 24 whereby, upon actuation of tightening screw 22 the signal light 24 is tightly retained in position. It will be readily appreciated that the signal device may take the form of a visual signal light, as illustrated, or that a suitable audio signal, such as a battery operated bell, buzzer or the like might be satisfactorily used as well.

The signal device 10 includes an upright post 32 which is retained with respect to rod 12 by clamp 18, the post being positioned forwardly of the reel 14 and intermediate the ends of line 16, there being a cross member 34 carried intermediate the ends of the post 32 and an arm 36 swingably carried at the uppermost end of post 32, said arm 36 being swingable about an axis 38.

The arm 36 rotatably carries a pair of idler wheels, there being one idler wheel 40 and an other idler wheel 42, the other idler wheel 42 being positioned at the end of arm 36 proximal to the reel 14, the idler wheel 40 being positioned at the other end 44 of arm 36. The one end 46 of arm 36 is provided with a plurality of openings 48 therethrough which are intended to selectively receive the axle 50 which rotatably carries idler wheel 42 so that the arm 36 may be balanced about pivot point 38 when the device 10 is in use, the particular position of wheel 42 depending upon the conditions surrounding the use of the rod which carries the device, such as wind drag, weight of bait or lure, condition of water or other variable characteristics which tend to vary the tension placed upon line 16.

Figure 2:
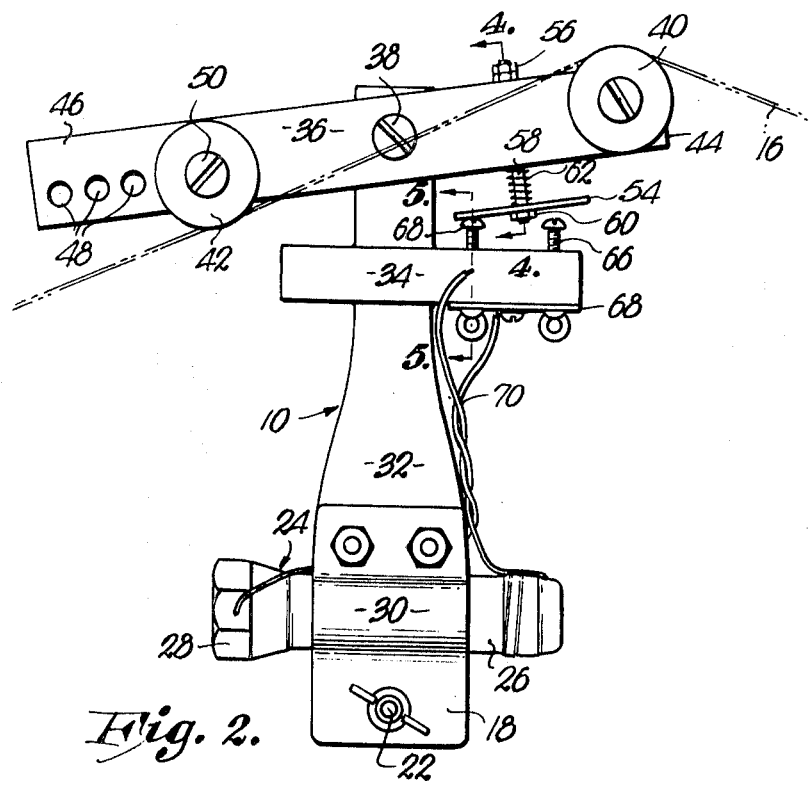
FIG. 2 is an enlarged view of the signal device with the fishing line being fragmentarily shown.
Figure 3:
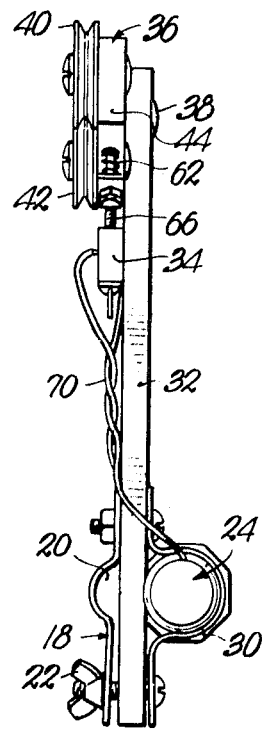
FIG. 3 is a front elevational view of the signal device.
Figures 4, 5:
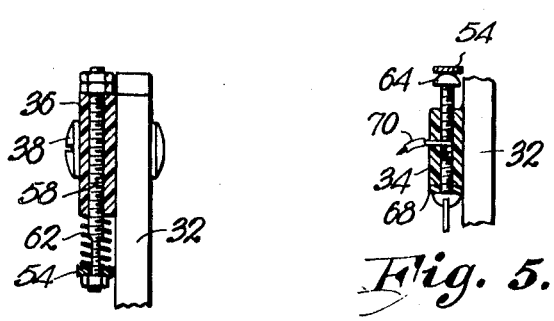
FIG. 4 is a sectional view taken on line 4–4 of FIG. 2.
FIG. 5 is a sectional view taken on line 5–5 of FIG. 2.

As is shown in FIG. 1, the line 16 extends upwardly at an angle from an eye 52 on rod 12 and is trained over the one idler wheel 40 and under the other idler wheel 42, the line then passing into the reel 14. It is desirable, when the device is in use, that the one wheel 40 be positioned above the other wheel 42 and that the swinging arm be maintained in a forwardly inclined position by the tension of line 16 so that when further tension is exerted on the line, as by a fish striking the bait, the arm 36 will be swung downwardly, viewing FIGS. 1 and 2, whereby to actuate the device in a manner hereinafter described. It will be readily appreciated that, in order to balance the arm 36 in the desired position and to maintain the proper tension upon line 16 to insure effective operation of the device 10 the idler wheel 42 may be readily positioned in any selected opening such as 48.

Arm 36 has a contact plate 54 depending therefrom, the plate 54 being carried by mounting means 56 in the nature of an adjustable threaded rod 58, the rod 58 extending through arm 36 and shiftably carrying the contact plate 54 at the lower end thereof, the plate 54 being retained thereon as by a nut 60 and biased along rod 58 as by a resilient spring 62 whereby to urge the contact plate 54 against nut 60. As is apparent the contact plate 54 swings with the arm 36 and due to the particular means of mounting thereof and the fact that there is a sloppy fit between the plate 54 and rod 58 may readily accommodate itself to a pair of contact points which are in relatively different positions.

The contact points 64 and 66 of signal device 10 are carried by cross member 34 and are in the nature of screws extending upwardly therefrom in the same vertical plane as contact plate 54 and arm 36, thereby placing said points 64 and 66 in the path of downward swinging movement of plate 54.

Crossarm 34 also carries a suitable terminal plate 68, the contact points 64 and 66 and the terminal plate 68 being wired, as by suitable leads 70 to the signal light 24.

As is apparent from the foregoing, when the signal device 10 is placed in use and the line 16 trained over wheel 40 and under wheel 42, the device will be maintained in a position of readiness with the contact plate 54 out of contact with points 64 and 66, the balancing of arm 36 in this position being achieved by the selective positioning of wheel 42. When further tension is placed on line 16, as when a fish strikes the bait, arm 36 is swung downwardly, by virtue of the increased tension on line 16 and upon such downward swinging movement plate 54 moves into contact with points 64 and 66, bridging the same and completing an electrical circuit thereby actuating the signal light 24. Because of the particular manner of mounting plate 54 contact with both of points 64 and 66 is always insured regardless of the particular position of said points, this insuring that an electrical circuit to actuate either the audio or visual signal device will be completed whenever arm 36 is swung by there being a fish on line 16.

Having thus described the invention, what I claim as new and desired by Letters Patent is:

1. A signal device for a fishing rod having a reel and a length of fishing line, said device comprising:

an upright post carried by said rod forwardly of the reel and intermediate the ends of the line;

an arm swingably carried at the uppermost end of said post;
a pair of idler wheels rotatably carried by said swingable arms, said line being trained over one of said wheels and under the other of said wheels;
a contact plate depending from said swinging arm and swingable therewith;
mounting means depending said contact plate from said swinging arm, said contact plate being shiftably carried by said mounting means;
a pair of electrical contact points in the path of downward swinging movement of said contact plate;
resilient means carried by said mounting means and biasing said contact plate toward said contact points; and
a signal device coupled with said contact points, said contact points being engageable by said contact plate upon downward swinging movement of said arm to complete an electrical circuit and actuate said signal device.

2. A signal device as set forth in claim 1, wherein there is a cross member carried by said post between the rod and the swinging arm, said contact points being carried by said cross member.

3. A signal device as set forth in claim 5, said contact points being adjustable with respect to said cross member and said contact plate.

4. A signal device as set forth in claim 1, said swinging arm having a plurality of openings in said end thereof proximal to the reel for selectively receiving said other idler wheel to permit balancing of the swinging arm with respect to the post when the fishing rod is in use.

5. A signal device as set forth in claim 4, said signal device being in the form of a visual signal.

6. A signal device as set forth in claim 4, said signal device being in the nature of an audio signal.